United States Patent [19]

Tominaga et al.

[11] 3,931,704

[45] Jan. 13, 1976

[54] WATCH CASE AND METHOD FOR MANUFACTURING THE SAME

[75] Inventors: Hiroshi Tominaga; Masanobu Takamatsu, both of Yokohama, Japan

[73] Assignee: Tokyo Sharyo Seizo Kabushiki Kaisha, Japan

[22] Filed: Oct. 23, 1973

[21] Appl. No.: 408,870

[30] Foreign Application Priority Data

Oct. 24, 1972 Japan .............................. 47-106576

[52] U.S. Cl. .................... 58/88 R; 58/88 G; 29/179; 29/420; 29/DIG. 25

[51] Int. Cl.[2] .................... G04B 37/00; B23P 13/00; B22F 5/00

[58] Field of Search ................ 58/88 R, 88 G, 90 B; 29/179; 423/446

[56] References Cited

UNITED STATES PATENTS

| | | | |
|---|---|---|---|
| 2,968,910 | 1/1961 | Taubert | 58/90 B |
| 3,242,664 | 3/1966 | Lederrey | 58/88 R |
| 3,399,254 | 8/1968 | Dunnington | 423/446 X |
| 3,525,210 | 8/1970 | Nakamura | 58/88 |
| 3,574,580 | 4/1971 | Stromberg et al. | 423/446 X |
| 3,669,695 | 6/1972 | Iler et al. | 58/88 X |

*Primary Examiner*—George H. Miller, Jr.
*Attorney, Agent, or Firm*—Steinberg & Blake

[57] ABSTRACT

A watch case wherein a back wall is integral with a side wall which projects forwardly from the back wall while surrounding a space which is closed at one end of the side wall by the back wall and which is open at the opposed end of the side wall, the latter having a pair of integral lugs projecting laterally from each of a pair of opposed regions thereof for supporting watchband holding rods. The one-piece body which includes the latter structure is formed of sintered diamond particles.

10 Claims, 4 Drawing Figures

WATCH CASE AND METHOD FOR MANUFACTURING THE SAME

BACKGROUND OF THE INVENTION

The present invention relates to watches.

In particular, the present invention relates to watch cases designed to house the watch movement.

It is conventional to utilize for cases of wristwatches or pocket watches a metal such as stainless steel, brass, nickel, silver, gold, or platinum. These materials are used for a number of reasons among which is the reason that such materials have sufficient strength to withstand the daily use of the watch while protecting the internal movement. In addition, the appearance of the watch case has become of increasing importance during recent times, and metals such as those referred to above have not only the required strength but also the required appearance. Thus, various types of known watch cases have been manufactured in such a way that the watch case is made of brass with a chrome plating, or the watch case is made of stainless steel, while other watch cases are made of precious metals such as white gold, green gold, etc. Over the years the manufacture of watch cases has developed from the time when artistic pocket watches with engraving on the watch case were preferred until the present time where watch cases of relatively simple structure are mass produced.

Although many years have passed since watch cases of the above type have been manufactured, no notable improvements have been made in the watch cases. Thus, with respect to strength, conventional watch cases are not satisfactory in that they are easily scratched or scarred, for example, as a result of impact against foreign bodies, rubbing against foreign bodies, or contact with personal belongings or the like. In addition, with respect to esthetic appearance, conventional watch cases have not been satisfactory inasmuch as machining is essential at the final finishing stage, and as a result many desired configurations of a watch case cannot be manufactured because of the limitations resulting from the machining requirements.

For reasons of comfort as well as appearance it is highly desirable to make a watch, particularly a wristwatch, as thin as possible. However, because of the strength requirements, metal watch cases of the type referred to above cannot be made as thin as desired.

Furthermore, it is customary with most metal watch cases to provide a removable back cover which either has a press fit or a threaded fit. Because of the high costs which would be involved in providing a watch case having an integral back wall, such removable covers are customary. However, these covers create problems such as problems with retaining the cover in position as well as problems with respect to access of tiny dust particles into the interior of the watch case.

In addition, moisture can enter into the interior of conventional watch cases through the connection at the back cover, or moisture can be undesirably created due to condensation as when an individual uses a watch out in cold weather and then enters into a relatively warm room where humidity is relatively high.

Furthermore, with conventional watch cases because of the machining requirements it is not possible to avoid sharp edges and corners which undesirably catch on clothing and other articles providing injury thereto in an undesirable manner.

Also, it is not always possible to provide for a watch a color which is desired.

SUMMARY OF THE INVENTION

It is accordingly a primary object of the present invention to provide a watch case, and watch case manufacturing method, which will avoid the above drawbacks.

In particular, it is an object of the present invention to provide a watch case which can readily be manufactured with an integral back wall so that all the problems resulting from conventional removable covers are eliminated.

Also it is an object of the present invention to provide a watch case which while being relatively thin nevertheless has the required strength. Thus, it is an object of the invention to provide a watch case which has a greater strength than a conventional metal watch case of the same dimensions.

Furthermore, it is an object of the present invention to provide a watch case which will greatly reduce the possibility of condensation of moisture either at the exterior or interior of the watch case as well as greatly reducing the possibility of entry of dust into the interior of the watch case.

Furthermore, it is an object of the present invention to provide a watch case and manufacturing method which are not limited by machining requirements so that the watch case can be manufactured in any desired configuration while being free of any sharp edges or corners.

Also it is an object of the present invention to provide a watch case which may have any desired color or combination of colors.

Furthermore, it is an object of the present invention to provide a watch case where the lugs which carry the watch-band supporting rods are formed integrally with the remainder of the watch case.

According to the invention the watch case includes a back wall and a side wall integral with and projecting forwardly from the back wall while surrounding a given space which is closed at one end by the back wall while remaining open at an opposed end of the side wall. This side wall has opposed regions each of which carries a pair of integral laterally extending lugs for supporting a watch-band holding rod. Thus, a one-piece body is provided, this body including the back wall, the side wall, and the lugs of the watch case, and in accordance with the invention this one-piece body is made of sintered diamond particles.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
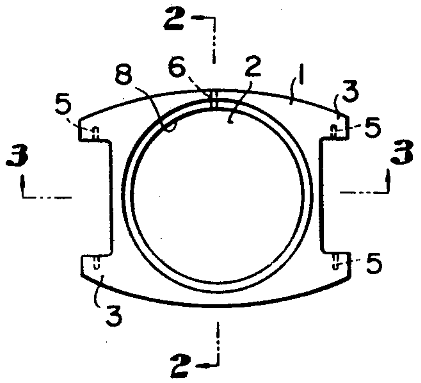
FIG. 1 is a view of one possible watch case according to the invention as seen when looking into the hollow interior of the watch case.
Figure 2:
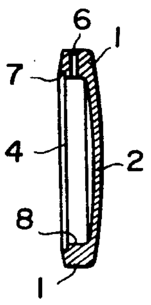
FIG. 2 is a section of the case of FIG. 1 taken along line 2—2 of FIG. 1 in the direction of the arrows.
Figure 3:
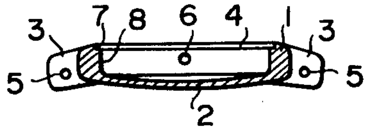
FIG. 3 is a section of the case of FIG. 1 taken along line 3—3 of FIG. 1 in the direction of the arrows.
Figure 4:
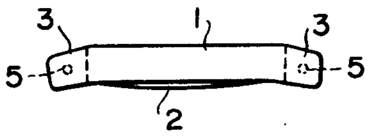
FIG. 4 is a bottom end view of the case of FIG. 1 as seen when looking upwardly toward the bottom of the structure shown in FIG. 1.

As is apparent from the above, in accordance with the invention the watch case is made of unique materials which heretofore have not been used for this purpose, these materials enabling the watch case of the invention to be free of the drawbacks of the known watch cases while having characteristics superior to those of conventional watch cases while at the same time enabling the watch case to be economically manufactured, utilizing recently developed techniques in the use of the unique materials.

Thus, in accordance with the invention the watch case is formed of sintered diamond particles in the form of a diamond powder which is sintered under conditions of high pressure and temperature in a suitable mold, achieving in this way all of the requirements of a watch case while at the same time maintaining great economies and achieving high ornamental values.

Referring to the drawings, it will be seen that the illustrated watch case includes a back wall or cover 2 from which a side wall 1 projects forwardly, this side wall being integral with the back wall 2 and surrounding a space which is closed at the rear by the cover 2 and which is open at the front opposed end of the side wall 1. The side wall 1 is formed with the bore 6 which extends through the side wall perpendicularly to a central axis surrounded by the side wall, this bore 6 being adapted to receive the stem of the crown which is used for winding the watch or setting the hands thereof. In addition, the side wall 1 has opposed regions, shown at the right and left in FIG. 1, each of which has a pair of integral lugs 3 projecting laterally therefrom for supporting the watch-band holding rod, such rods conventionally having spring-pressed ends capable of being received in bores 5 which are formed in the lugs 3.

At the front opening 4 the side wall 1 is formed with the shoulder 7 which extends radially from the inner surface 8 of the side wall 1 as well as rearwardly from the front surface of the side wall 1 which is visible in FIG. 1. The shoulder 7 is adapted to hold the bezel which carries the crystal. Thus, the entire structure shown in the drawings is in the form of a one-piece body consisting of sintered diamond particles.

Of course the bores 5 for the ends of the watch-band holding rods extend only partly into the lugs 3 from the space between each pair of lugs 3. Moreover, although only a single bore 6 is shown for the stem of the crown, it is possible to provide additional stem bores at desired locations in accordance with the particular construction of the watch movement. The space surrounded by the inner surface 8 of the side wall 1 receives the watch movement, this space being limited at the rear by the wall 2.

In accordance with the method of the present invention, the mold which is used during sintering has core members at the bores 5 and 6 so that the sintered material is formed around these core members, and in this way the bores 5 and 6 are formed in the body during sintering thereof. In this way considerable manufacturing economies are achieved.

The configuration of the watch case is determined in such a way that it will fit well on the wrist during use of the watch while presenting an esthetically desirable appearance. However, the watch case is molded during sintering in such a way that it has no sharp points or corners which are likely to catch on clothing or the like. Thus, the mold in which the sintering takes place has a configuration which will provide the exterior of the watch case with suitably curved surfaces. With conventional watch cases the necessity of machining with lathes, milling machines, and the like, makes it impossible to provide a watch case which has such curved exterior surfaces. In contrast, with the present invention, when the sintered article is removed from the mold its surface does not require any further finishing. It is therefore possible to design the watch case with complete freedom from the standpoint of human engineering while at the same time also achieving a desired esthetic appearance.

The diamond particles which are sintered in order to manufacture the watch case of the invention are preferably in the form of an artificial diamond powder such as is readily available on the market, because of the economic advantages which are achieved in this way. The sintering technique is well known. It is possible to purchase artificial diamond powder at an extremely low price with the grain size of the particles being extremely small, which is to say, in a range of approximately several microns (such as 10 microns or less) up to several hundred microns, which is to say less than 1000 microns and preferably less than 500 microns. The greatest advantages are achieved by using a diamond powder having an extremely small grain size on the order of only several microns. The smaller the grain size the greater the quality of the resulting product. Furthermore, the selected grain size is uniformly maintained throughout the entire product so that there will be no undesirable concentration of strength in any particular direction or at any one part of the molded product.

As was pointed out above, the molded product in general does not require any additional finishing since it is possible to mold the diamond powder into a precisely determined shape while achieving a product with a high degree of accuracy and with a smooth exterior surface. If any additional finishing is necessary, the product can be polished by using a diamond powder, but in general such additional finishing is not required.

It is to be noted that the configuration of the watch case is such that the space surrounded by the surface 8 and limited at its rear by the back wall 2, while having the shoulder 7, enables the molded product to be readily withdrawn from the mold.

As is well known, diamond particles of the above type can have any of a large number of desired colors, ranging over the entire spectrum, such as pink, green, black, gray, brown, yellow, blue, white, etc., in accordance with the substances contained in the powder, such as manganese. However, it is also possible to achieve a desired color by artificially coloring the diamond using a known technique of exposing the diamond to irradiating radioactive rays.

Thus, a further advantage which can be achieved by using diamond particles as described above is that it becomes possible to select from various colors for the watch case either by initially selecting diamond powder of given colors or by artificially coloring the diamond in the manner described above. In addition it is very easily possible to provide the watch case of the invention with two or more different colors located at selected parts of the watch case. The selected color will be permanently maintained.

It is emphasized in this connection that the selection of color is not merely a matter of ornamental or esthetic appearance. Thus, it is known that it is desirable to provide a watch that can be easily read under a number of different lighting conditions, and the selection of color will be made in accordance with the coloration of the face of the watch and the numerals and hands visible at the face of the watch in such a way that suitable contrast in coloration is achieved to provide a watch satisfying not only esthetic requirements but also requirements with respect to easy readability.

In accordance with the invention the thickness of the various parts of the watch case is small as possible while assuring that the required strength is achieved. In this way it becomes possible to use the minimum amount of diamond powder while achieving a watch case which is as thin as possible. Experience has shown that for a watch case of a given strength the diamond powder material used for the watch case of the present invention enables the watch case to have a lesser thickness than a conventional metal watch case.

The watch movement is introduced into the watch case of the invention through the front opening 4 so as to reside in the space surrounded by the surface 8 and limited at the rear by the back wall 2. The watch mechanism is retained in place, for example, by way of an earthquake-proof supporting structure, as is generally known in the art. The unillustrated winding crown is connected to the movement from the outside with the stem extending through the bore 6. The watch glass or crystal is carried by a bezel or seat which is joined to the shoulder 7 from the outside of the watch case. If desired an additional shoulder may be provided, simultaneously with the formation of the shoulder 7, for accommodating a packing or sealing ring or the like, so that the hollow interior of the finished watch will be sealed off from the outer atmosphere.

A watch band is secured to the watch case by inserting through the opening at the end of the watch band a rod carrying as is well known, spring-pressed axially movable ends which can be received in the bores 5 at each pair of lugs 3, in a manner which is well known with conventional watches.

Thus, as has been pointed out above, during normal use of a watch, the case thereof will encounter considerable friction, impact, and the like, and the result is that conventional watch cases are easily scratched or damaged. In contrast, with the watch case of the invention, the sintered diamond cannot be scarred or damaged during such normal use of the watch. The watch case of the present invention maintains its surface lustre and has a permanent highly desirable ornamental effect. In addition, by giving a suitable roundness to the watch case particularly at the corner portions thereof injury to other articles is avoided.

Since the watch case of the invention is made by sintering diamond powder, a homongenous product is achieved without any localized areas of greater strength or hardness and less strength or hardness, in a given direction, as is the case with natural diamond. In addition, the sintered powdered diamond watch case of the invention has a far greater strength than any metal watch case of comparable dimensions, so that it becomes possible to achieve with the watch case of the present invention a smaller thickness than has heretofore been possible. Thus the result is a saving in the material of the watch case as well as achievement of a thin and compact structure for the entire watch. Such thin and compact watches are highly advantageous both from practical and ornamental viewpoints.

A further advantage achieved with the watch of the invention is that condensation of droplets of water at the surface of the watch case is reliably avoided. Thus, the temperature of the entire watch case necessarily changes under the influence of exterior temperature changes, particularly temperature changes in the atmosphere in which the watch is located or at objects which engage the watch. Thus the temperature of the watch case will be determined by the surroundings thereof, by air flow, and the like. If the temperature of the watch case is always the same as that of the surrounding atmosphere, there will be no condensed water droplets at the surface of the watch case since the relative humidity of the air adjacent the watch case will be substantially equal to that of the atmospheric air, except for the special case where the humidity percentage in the atmosphere is 100 percent. Thus, in the event that the wearer or user of the watch enters suddenly into a warm room from an outside cold atmosphere, the air which surrounds the watch case has been cooled to a temperature lower than the dew point, since a certain period of time must elapse before the watch case warms up to the room temperature, and as a result there will be condensation at the watch case. In some cases the condensation is created in the interior of the watch case with poor results with respect to the operation of the movement.

However, with the watch case of the present invention these drawbacks with respect to condensation are very greatly minimized. This advance is achieved because the watch case of the invention is relatively thin, as compared to conventional watch cases, and as a result has a relatively high coefficient of thermal conductivity. In general diamond has a high thermal conductivity, the latter being as high as aluminum, and thus the temperature of the watch case of the invention will rapidly rise to the surrounding temperature in the case where the watch case is transferred from a region of cold temperature to a region of higher temperature. In this way condensation is avoided.

In addition, diamond has an extremely small coefficient of thermal expansion, so that the change in size which occurs with temperature change is extremely small even if a large temperature change is encountered. This characteristic is also highly desirable since it further protects the internal watch movement.

Also, in the case of a conventional watch, the back cover and case wall are separate elements which are directly connected either with a press fit or with a threaded connection. With such conventional constructions, perspiration at the wrist of the wearer adheres to the watch case and easily penetrates into the interior thereof as a result of capillary action. Thus, injury to the watch movement occurs under these conditions. In addition, if any minute gap remains enabling air to enter into the interior of the watch case, fine particles of dust will have access to the interior of the watch case. Therefore, it is clear that considerable advantages are achieved by providing a back wall and side wall which are integral since in this way a superior protection of the mechanism in the interior of the watch case is achieved. However, considerable difficulties are encountered with conventional metal watch cases in achieving an integral back wall and side wall. Thus, if such an integral back wall and side wall are achieved by machining, undesirably high manufacturing costs are encountered inasmuch as the material as well as the machining costs are extremely high. Also, while it is possible to provide a unitary watch case structure by forging, such procedures are not advantageous in a practical way since the durability of the dies used in the forging is not sufficiently great with respect to materials such as stainless steel, and in addition even with such manufacturing techniques it becomes necessary to provide a subsequent final finishing by machining operations.

In sharp contrast with the latter drawbacks, the watch case of the present invention, because it is formed by sintered diamond particles, is capable of having a back wall and side wall which are integral, without undesirably increasing the cost or involving additional finishing problems or the like. Thus, with the present invention the problems resulting from providing a watch case with a separate back cover are completely eliminated. Thus, with the watch case of the invention a waterproof closure is achieved in a highly reliable manner without any concern with respect to the joint between a back cover and side wall. Furthermore, any troubles which arise because of looseness of the back cover are avoided. In addition, since the watch case of the present invention is made of a sintered diamond powder, machining of the watch case can be eliminated inasmuch as the surface of the product as it comes out of the mold is sufficiently hard and dense so that it can be used for the finished watch case without any further treatment. Also, further economies are achieved by forming all parts of the watch case, including the lugs 3 thereof, in a single operation in the form of a one-piece body.

As was indicated above, a further advantage of the invention resides in the fact that the watch case can be made in any desired shape without encountering undesirable high cost. As was pointed out above, with conventional watch cases final finishing involves the use of machine tools such as lathes, milling machines, or the like. As a result, it is necessary to provide the watch case with a configuration which must include combinations of flat surfaces, cylindrical surfaces, conical surfaces, and the like. Also, roundness of the watch case at corner portions is limited with conventional constructions to an extent such as that which is permitted by machining operations. It is therefore not possible to select freely the extent of curvature or combination of curvatures at the exterior surface of conventional watch cases.

In contrast, with the watch case of the present invention any desired curvature can be achieved simply by providing a desired shape of the mold in which the sintering is carried out, and it is possible to provide watch cases of relatively complex configurations without undesirably high costs and while maintaining a high degree of precision.

In addition, since sintered diamond powder is used for the watch case of the invention it is possible to provide the watch case with any desired colors, so as to increase its ornamental value as well as the visibility and readability thereof, as pointed out above. The surface of the sintered diamond powder is sufficiently hard and beautiful as it comes from the mold. However, it is also possible to achieve different colors at the surface of the watch by suitably selecting for the diamond material powder which has the desired colors so that in this way it is possible to increase the ornamental effect which is achieved by the particular combination or disposition of the various colors.

Furthermore, as is pointed out above it is possible to impart desired colors to the watch case by irradiating radioactive rays thereon.

Therefore, in accordance with the present invention it is possible to achieve a new, extremely attractive watch case which has a construction of the highest quality.

What is claimed is:

1. For use in a watch, a one-piece case having a back wall and a side wall projecting forwardly from said back wall and surrounding a space which is closed at one end of said side wall by said back wall and which is open at an opposed end of said side wall, said side wall having a pair of opposed regions each of which carries a pair of laterally extending lugs for supporting a watch-band holding rod, said lugs forming an integral part of said one-piece case and said one-piece case being formed in its entirety of sintered diamond particles, the thickness of said back wall and the dimension of said side wall between said ends thereof being less than the thickness of the side wall and back cover of a metal watch case of comparable strength.

2. The combination of claim 1 and wherein said side wall has an inner surface at said space surrounded by said side wall and said side wall having at said open end of said space a forwardly directed shoulder extending radially from said inner surface of said side wall and rearwardly from a front surface of said side wall.

3. The combination of claim 1 and wherein said side wall surrounds a central axis and is formed between said opposed regions with at least one bore extending through said side wall between the ends thereof perpendicularly with respect to said axis.

4. The combination of claim 1 and wherein each pair of lugs at each of the opposed regions of said side wall has a pair of inner surfaces directed toward each other and said lugs being formed at said inner surfaces with bores extending partly through said lugs and communicating with the space between each pair of lugs for receiving the ends of a watch-band holding rod.

5. The combination of claim 1 and wherein the case has an exterior curved surface which is free of any sharp edges, corners, or the like.

6. The combination of claim 1 and wherein the diamond particles are small enough to form a diamond powder.

7. The combination of claim 1 and wherein the diamond powder has a size range of between several microns and several hundred microns.

8. The combination of claim 1 and wherein the watch case has at least one color selected from the entire spectrum.

9. The combination of claim 1 and wherein the watch case has different portions which respectively have different colors.

10. The combination of claim 1 and wherein the sintered diamond particles are in the form of an artificial diamond powder.

* * * * *